UNITED STATES PATENT OFFICE.

WILLIAM D. FOLGER, OF CALCUTTA, EAST INDIES, ASSIGNOR OF PART OF HIS RIGHT TO JOHN H. DILLON, OF LONDON, ENGLAND, FLETCHER WESTRAY, ALFRED H. GIBBS, AND JOHN J. WESTRAY, OF NEW YORK CITY, AND HENRY H. HAMLIN, OF NORWICH, CONN.

IMPROVEMENT IN COMPOSITIONS FOR PREVENTING THE FOULING OF SHIPS' BOTTOMS.

Specification forming part of Letters Patent No. 179,180, dated June 27, 1876; application filed May 27, 1876.

*To all whom it may concern:*

Be it known that I, WILLIAM D. FOLGER, of the city of Calcutta, East Indies, have discovered a new and useful Compound for Preventing the Accumulation of Barnacles or the Fouling of the Bottoms of Vessels, and for other purposes, which compound is fully set forth in the following specification:

This discovery relates to that class of compounds employed, principally, in covering the bottoms of vessels to prevent fouling, or the accumulation of barnacles or other matter thereon, and may be found equally useful in the protection and preservation of other structures and articles; and consists in a composition formed by combining calcined sea-weed, or sea-weed ashes, carbolic acid, and iodine, or their chemical equivalents, in suitable proportions, with or without coal-dust or coal-ashes, employed principally as a body to increase the bulk thereof.

To prepare this compound the several ingredients in the following proportions are found to answer an excellent purpose, and to effect the object desired; but may be varied, or other chemical equivalent articles substituted in their places to produce the same effect, to suit the different manufacturers thereof.

Combine one part of calcined sea-weed or sea-weed ashes, one part of carbolic acid, and one part of iodine with one hundred parts of coal-dust or coal-ashes, or other suitable material employed principally as a body therefor. These several ingredients, when used in the form of powder, should be sifted or bolted, that they may be thoroughly incorporated in the process of manufacture and become a homogeneous mass.

When these several ingredients, or their chemical equivalents, shall have thus been combined, the compound is ready for use, and may be mixed with linseed-oil, or any other suitable fluid, by which it may be laid or spread upon the surface of the bottoms of vessels or other structures to be preserved.

In this mixture or compound the coal-dust or coal-ashes are used principally as a body for the other ingredients to dilute them, and might be dispensed with where a limited quantity of the compound is required, by increasing the proportion of calcined sea-weed or sea-weed ashes, or the substitution of some other suitable article therefor which would answer the same purpose as a body.

For limited use the three principal ingredients, or the chemical equivalents thereof—viz., calcined sea-weed or sea-weed ashes, carbolic acid, and iodine—might be used by themselves by simply adding a suitable liquid, so that the compound might be laid upon the surface to be preserved in a thin body, dispensing with the coal-dust altogether, though this would not be an economical method of using the compound.

It is evident that any vegetable matter containing sufficient iodine would dispense with prepared crystal or liquid iodine, and, as an example, provided the calcined sea-weed or sea-weed ashes contained sufficient iodine, the two—seed-weed ashes and carbolic acid—would produce the same compound as calcined sea-weed, carbolic acid, and prepared iodine, the excess of sea-weed ashes also substituting the coal-ashes or coal-dust as a body for the compound.

I desire to be distinctly understood that I do not confine myself to the exact proportions in preparing this compound herein set forth, nor to the several specific ingredients composing the same; but any other compound consisting of the same equivalent chemical ingredients would be the equivalent thereof.

Having thus fully set forth my discovery of a compound for preventing the fouling of vessels or the accumulation of barnacles or other matter thereon, and for other purposes, what I claim therein as new, and desire to secure by Letters Patent, is—

A compound, consisting of sea-weed ashes, carbolic acid, and iodine, with or without coal-dust or coal ashes as a body therefor, substantially as and for the purpose herein set forth.

W. D. FOLGER.

Witnesses:
THOS. A. LATHROP,
R. C. EDWARDS.